United States Patent
Rifat et al.

[11] Patent Number: 5,931,677
[45] Date of Patent: Aug. 3, 1999

[54] EDUCATIONAL GLOBE TOOL

[76] Inventors: Cengiz Rifat; Louise Clifford, both of Flat 1—95 Muswell Hill Road, Muswell Hill, London, United Kingdom, N10 3HT

[21] Appl. No.: 09/044,327

[22] Filed: Mar. 19, 1998

[51] Int. Cl.⁶ .............................. G09B 27/08; A63F 1/00
[52] U.S. Cl. ........................ 434/131; 434/130; 434/145; 434/147; 273/237; 273/238; 273/241
[58] Field of Search ..................................... 434/130, 131, 434/133, 132, 145, 147; 273/237, 238, 241

[56] References Cited

U.S. PATENT DOCUMENTS

| | | | |
|---|---|---|---|
| 2,492,785 | 12/1949 | Concordet | 434/143 |
| 2,958,959 | 10/1960 | Hubbard | 434/131 |
| 2,987,318 | 6/1961 | Hammer | 273/157 R |
| 3,406,312 | 10/1968 | Redman | 315/13.1 |
| 4,449,941 | 5/1984 | McGuire et al. | 434/153 |
| 4,494,935 | 1/1985 | Miller | 434/132 |
| 4,595,367 | 6/1986 | Forsyth | 434/147 |
| 4,937,181 | 6/1990 | Rogers | 434/150 |
| 5,030,100 | 7/1991 | Hilderman | 434/132 |
| 5,057,024 | 10/1991 | Sprott et al. | 434/146 |
| 5,080,591 | 1/1992 | Forsyth | 434/147 |
| 5,137,280 | 8/1992 | Love | 273/282.1 |
| 5,217,226 | 6/1993 | Christopher | 273/157 R |
| 5,441,261 | 8/1995 | Margolis et al. | 273/157 R |

FOREIGN PATENT DOCUMENTS 2235805  3/1991  United Kingdom ................... 434/147

*Primary Examiner*—Robert A. Hafer
*Assistant Examiner*—Michael B. Priddy

[57] ABSTRACT

An educational globe-shaped tool is provided including a rigid sphere having a plurality of bores formed therein each with a lamp and a switch associated therewith which generates an activation signal when closed. A plurality of country pieces each having an outboard portion with a periphery shaped as a unique country. Each country piece further has a post for being removably coupled with an associated one of the bores for closing the switch thereof. Control circuitry is connected between each of the switches and the lamps. Such control circuitry is adapted to illuminate one of the lamps upon the receipt of an associated activation signal.

10 Claims, 2 Drawing Sheets

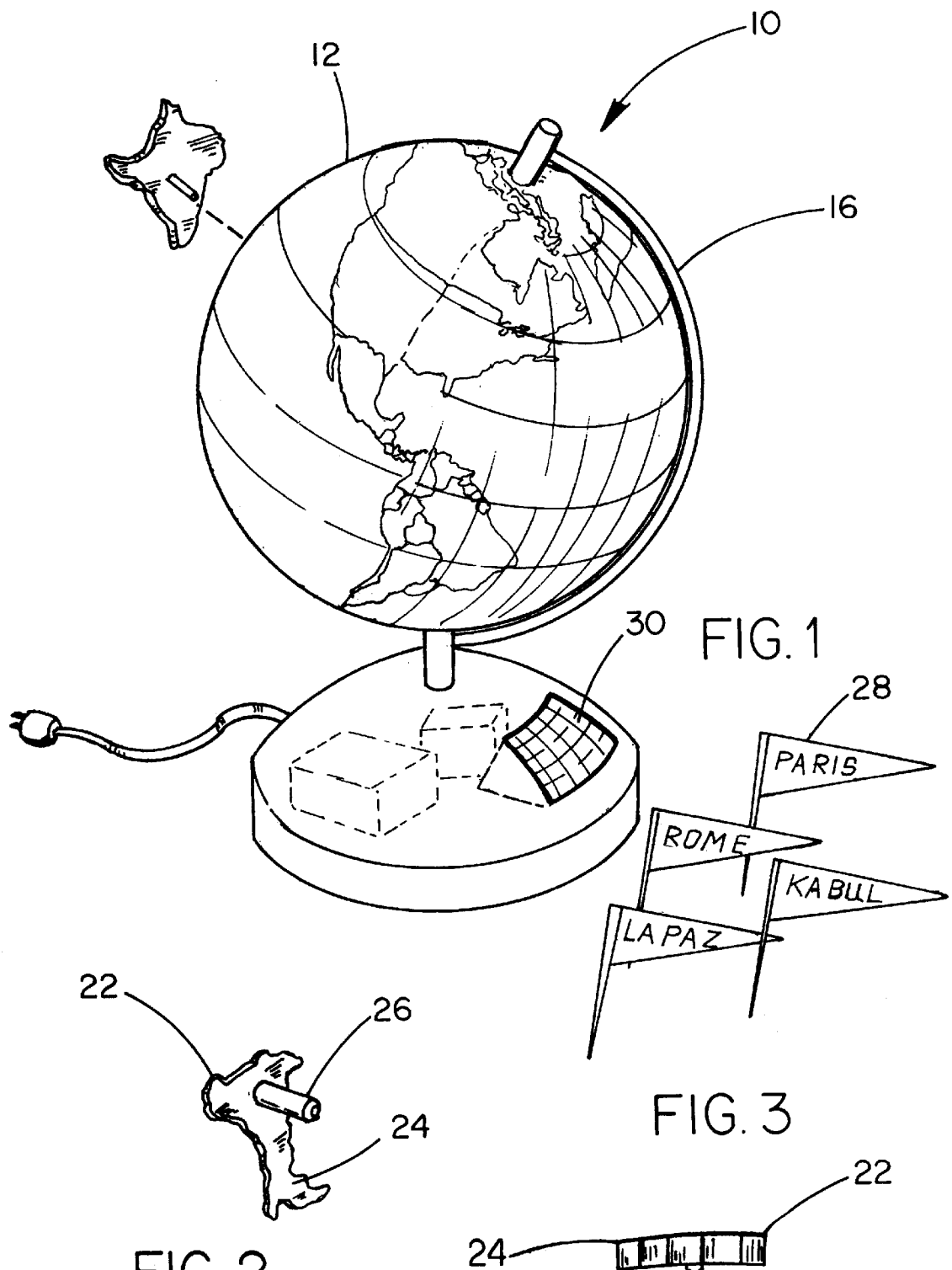

EDUCATIONAL GLOBE TOOL

BACKGROUND OF THE INVENTION

1. Field of the Invention

The present invention relates to illuminated globes and more particularly pertains to a new educational globe tool for educational and entertainment purposes.

2. Description of the Prior Art

The use of illuminated globes is known in the prior art. More specifically, illuminated globes heretofore devised and utilized are known to consist basically of familiar, expected and obvious structural configurations, notwithstanding the myriad of designs encompassed by the crowded prior art which have been developed for the fulfillment of countless objectives and requirements.

Known prior art illuminated globes include U.S. Pat. No. 5,217,226; U.S. Pat. No. 4,761,138; U.S. Pat. Des. 281,983; U.S. Pat. No. 5,030,100; U.S. Pat. No. 4,790,756; and U.S. Pat. No. 4,936,780.

In these respects, the educational globe tool according to the present invention substantially departs from the conventional concepts and designs of the prior art, and in so doing provides an apparatus primarily developed for the purpose of teaching a child geography while further providing entertainment.

SUMMARY OF THE INVENTION

In view of the foregoing disadvantages inherent in the known types of illuminated globes now present in the prior art, the present invention provides a new educational globe tool construction wherein the same can be utilized for educational and entertainment purposes.

The general purpose of the present invention, which will be described subsequently in greater detail, is to provide a new educational globe tool apparatus and method which has many of the advantages of the illuminated globes mentioned heretofore and many novel features that result in a new educational globe tool which is not anticipated, rendered obvious, suggested, or even implied by any of the prior art illuminated globes, either alone or in any combination thereof.

To attain this, the present invention generally comprises a rigid translucent sphere having a plurality of bores formed therein. The sphere includes a C-shaped mount with a pair of ends rotatably coupled to diametrically opposed ends of the sphere. As such, the sphere is adapted for rotating about a slanted axis. A hollow dome-shaped base is included having a bottom end of the C-shaped mount coupled thereto. Also included is a switch associated with each bore. Each switch is mounted adjacent to the associated bore within an interior space of the sphere for generating an activation signal upon the depression thereof. Further positioned adjacent to each bore is a lamp associated therewith and mounted within the interior space of the sphere. Each lamp is adapted for illuminating when actuated. Next provided is a plurality of translucent country pieces. As shown in FIG. 7, each country piece has an arcuate outboard portion with a periphery shaped as a unique country. Each country piece further has an inboard portion taking the form of a post. This post is adapted for being removably inserted within an associated one of the bores for closing the switch thereof. Also included is a plurality of city figurines each signifying a unique city. Each city figurine has a post for being removably inserted within an associated one of the bores of sphere. When inserted within the bore, it should be noted that the post further passes through an aperture formed in the outboard portion of the country piece and therefore closes the switch of the sphere. It should be noted that the aperture is located to simulate the actual location of the city with respect to the country. Next provided is a speaker situated on the base. In operation, the speaker is adapted for emitting audio signals upon the receipt thereof. Finally, control means is situated within the base and connected between each of the switches, the lamps and the speaker. During use, the control means is adapted to illuminate one of the lamps upon the receipt of an associated activation signal. Further, an audible phrase is simultaneously emitted from the speaker. The phrase is associated with the country or city that corresponds with the bore of the sphere.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new educational globe tool apparatus and method which has many of the advantages of the illuminated globes mentioned heretofore and many novel features that result in a new educational globe tool which is not anticipated, rendered obvious, suggested, or even implied by any of the prior art illuminated globes, either alone or in any combination thereof.

It is another object of the present invention to provide a new educational globe tool which may be easily and efficiently manufactured and marketed.

It is a further object of the present invention to provide a new educational globe tool which is of a durable and reliable construction.

An even further object of the present invention is to provide a new educational globe tool which is susceptible of a low cost of manufacture with regard to both materials and labor, and which accordingly is then susceptible of low prices of sale to the consuming public, thereby making such educational globe tool economically available to the buying public.

Still yet another object of the present invention is to provide a new educational globe tool which provides in the apparatuses and methods of the prior art some of the advantages thereof, while simultaneously overcoming some of the disadvantages normally associated therewith.

Still another object of the present invention is to provide a new educational globe tool for educational and entertainment purposes.

Even still another object of the present invention is to provide a new educational globe tool that includes a rigid sphere having a plurality of bores formed therein each with a lamp and a switch associated therewith which generates an activation signal when closed. A plurality of country pieces each having an outboard portion with a periphery shaped as a unique country. Each country piece further has a post for being removably coupled with an associated one of the bores for closing the switch thereof. Control circuitry is connected between each of the switches and the lamps. Such control circuitry is adapted to illuminate one of the lamps upon the receipt of an associated activation signal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new educational globe tool according to the present invention.

FIG. 2 is a rear perspective view of one of the country pieces of the present invention.

FIG. 3 is a perspective view of the city figurines of the present invention.

FIG. 7 is a top view of one of the country pieces of the present invention.

DESCRIPTION OF THE PREFERRED EMBODIMENT

Figure 4:
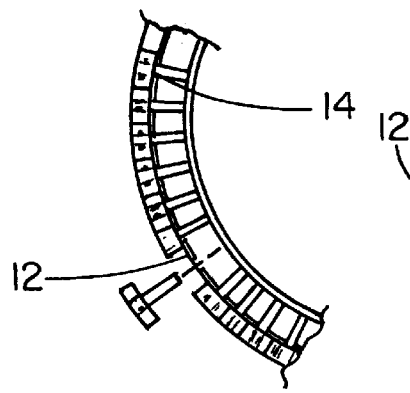
FIG. 4 is a cross-sectional view of the sphere of the present invention.
Figure 5:
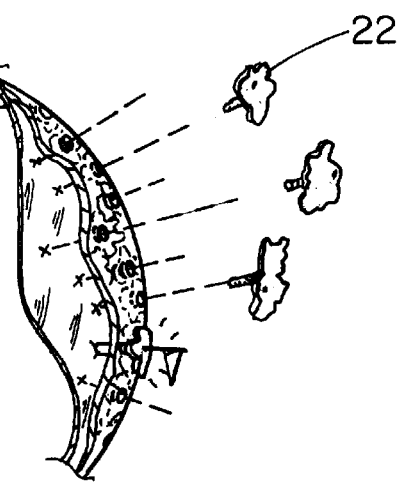
FIG. 5 is a perspective view of the present invention.

With reference now to the drawings, and in particular to FIGS. 1 through 6 thereof, a new educational globe tool embodying the principles and concepts of the present invention and generally designated by the reference numeral 10 will be described.

The present invention, designated as numeral 10, includes a rigid blank translucent sphere 12 having a plurality of bores 14 formed therein. As an option, the sphere may be colored blue to simulate sea water. The sphere includes a C-shaped mount 16 with a pair of ends rotatably coupled to diametrically opposed ends of the sphere. As such, the sphere is adapted for rotating about a slanted axis. A hollow dome-shaped base is included having a bottom end of the C-shaped mount coupled thereto.

Also included is a switch 18 associated with each bore. Each switch is mounted adjacent to the associated bore within an interior space of the sphere for generating a unique activation signal upon the depression thereof. Further positioned adjacent to each bore is a lamp 20 associated therewith and mounted within the interior space of the sphere. Each lamp is adapted for illuminating when actuated.

Next provided is a plurality of translucent country pieces 22. As shown in FIG. 7, each country piece has an arcuate outboard portion 24 with a periphery shaped as a unique country. Each country piece further has an inboard portion taking the form of a post 26. This post is adapted for being removably inserted within an associated one of the bores for closing the switch thereof.

Also included is a plurality of city figurines 28 each signifying a unique city. Such is accomplished by way of a flag with indicia printed thereon. Each city figurine has a post for being removably inserted within an associated one of the bores of the sphere 12. When inserted within the bore, it should be noted that the post further passes through an aperture formed in the outboard portion of the country piece and therefore closes the corresponding switch of the sphere. It should be noted that the aperture of the country piece is located to simulate the actual location of the city with respect to the country.

Next provided is a speaker 30 situated on the base. In operation, the speaker is adapted for emitting audio signals upon the receipt thereof. Finally, control means 32 is situated within the base and connected between each of the switches, the lamps and the speaker. During use, the control means is adapted to illuminate one of the lamps upon the receipt of an associated activation signal. Further, an audible phrase is simultaneously emitted from the speaker. The phrase is associated with the country or city that corresponds with the bore of the sphere which has been plugged. As such, the country and/or city is illuminated and a phrase such as "Bonjour . . . You have found Paris" is emitted. As an option, each country and city piece is shaped or sized to only be received in the appropriate bore. Further, in the alternative, magnets may be used in lieu of the posts and bores.

Figure 6:
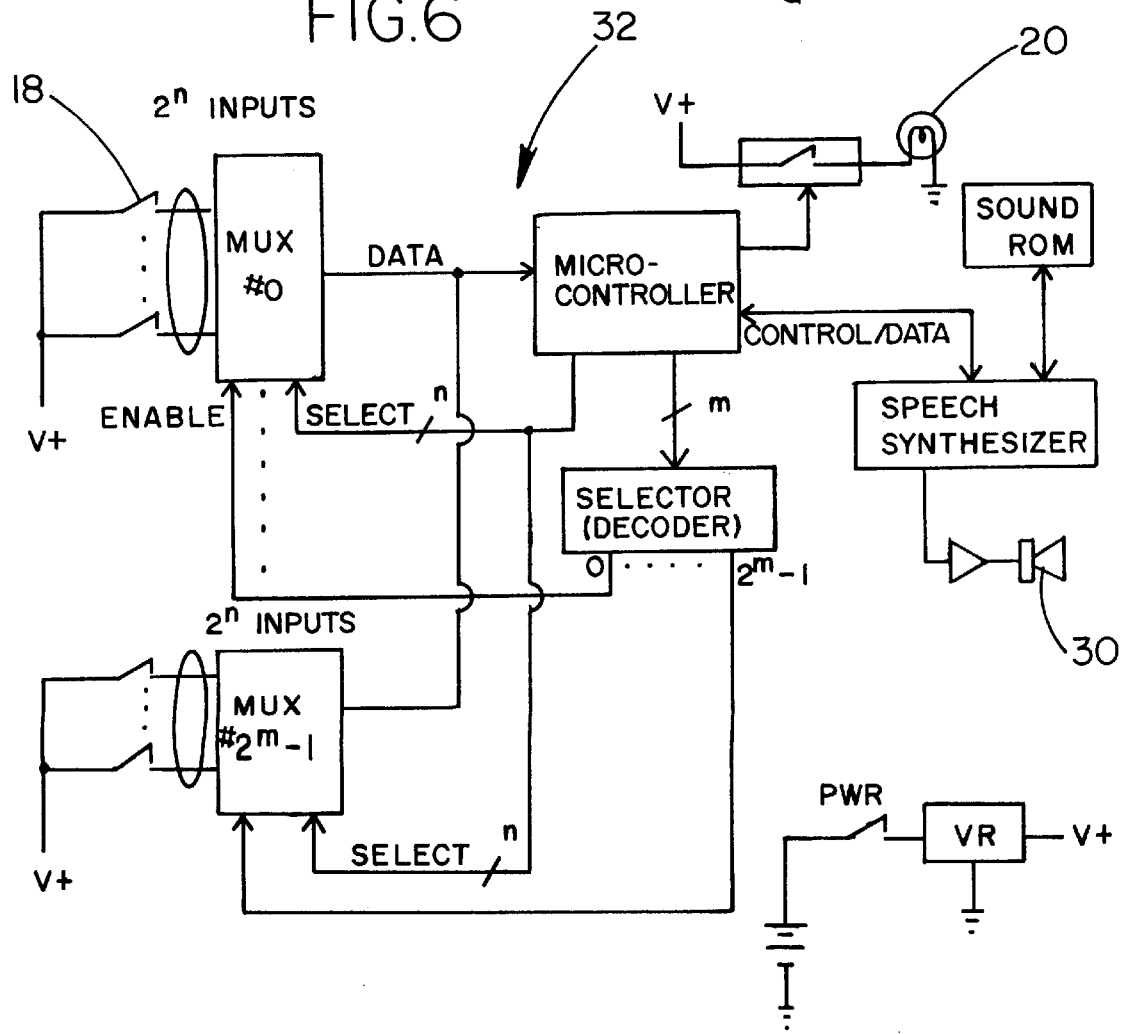
FIG. 6 is a schematic diagram of the electrical components of the present invention.

To accomplish the forgoing, the control means preferably includes a pair of multiplexers having inputs connected to the switches, as shown in FIG. 6. The multiplexers are in turn connected to a microcontroller which actuates the lamps and utilizes a sound read only memory and a speech synthesizer for generating the audible phrase. As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A educational globe-shaped tool comprising, in combination:

a rigid translucent sphere having a plurality of bores formed therein, the sphere including a C-shaped mount with a pair of ends rotatably coupled to diametrically opposed ends of the sphere for allowing the rotation thereof about a slanted axis, a hollow dome-shaped base having a bottom end of the C-shaped mount coupled thereto, a switch associated with each bore and mounted adjacent thereto within an interior space of the sphere for generating an activation signal upon the depression thereof, and a lamp associated with each bore and mounted adjacent thereto within the interior space of the sphere for illuminating when actuated;

a plurality of translucent country pieces each having an arcuate outboard portion with a periphery shaped as a unique country, each country piece further having an inboard portion taking the form of a post for being removably inserted within an associated one of the bores for closing the switch thereof;

a plurality of city figurines each signifying a unique city, each city figurine having a post for being removably inserted within an associated one of the bores of sphere and further passing through an aperture formed in the outboard portion of the country piece for closing the switch of the sphere;

a speaker situated on the base for emitting audio signals upon the receipt thereof; and control means situated within the base and connected between each of the switches, the lamps and the speaker, the control means adapted to illuminate one of the lamps upon the receipt of an associated activation signal and further simultaneously emit an audible phrase from the speaker, wherein the phrase is associated with the country or city that corresponds with the bore of the sphere.

2. An educational globe-shaped tool comprising:

a rigid sphere having a plurality of first coupling means formed therein each with a switch and a lamp associated therewith; each switch generating an activation signal when closed;

a plurality of country pieces each having an outboard portion with a periphery shaped as a unique country, each country piece further having a second coupling means for being removably coupled with an associated one of the first coupling means for closing the switch thereof;

control means connected between each of the switches and the lamps, the control means adapted to illuminate one of the lamps upon the receipt of an associated activation signal; and a plurality of city figurines each signifying a unique city, each city figurine adapted for being removably coupled with an associated one of the first coupling means of the sphere for closing an associated switch.

3. An educational globe-shaped tool as set forth in claim 2 wherein the control means is further adapted to emit an audible phrase from a speaker, wherein the phrase is associated with the country that corresponds with the first coupling means of the sphere.

4. An educational globe-shaped tool as set forth in claim 2 wherein the outboard portion of each country piece is arcuate.

5. An educational globe-shaped tool as set forth in claim 2 wherein a post of each city figurine passes through an aperture formed in the outboard portion of the corresponding country piece.

6. An educational globe-shaped tool as set forth in claim 2 wherein the first coupling means and the second coupling means include a bore and a post, respectively.

7. An educational globe-shaped tool as set forth in claim 2 wherin the first coupling means and the second coupling means include a bore and a post, respectively.

8. An educational globe-shaped tool comprising:

a rigid sphere having a plurality of first couples formed therein each with a switch associated therewith which generates an activation signal when closed and a lamp;

a plurality of country pieces each having an outboard portion with a periphery shaped as a unique country, each country piece further having a second couple for being removably coupled with an associated one of the first couples for closing the switch thereof;

a controller connected between each of the switches and the lamps, the controller adapted to illuminate one of the lamps upon the receipt of an associated activation signal; and a plurality of city figurines each signifying a unique city, each city figurine adapted for being removably coupled with an associated one of the first couples of the sphere for closing an associated switch.

9. An educational globe-shaped tool as set forth in claim 8 wherein the controller is further adapted to emit an audible phrase from a speaker.

10. An educational globe-shaped tool as set forth in claim 8 wherein the outboard portion of each country piece is arcuate.

* * * * *